United States Patent
Ni et al.

(10) Patent No.: US 10,310,913 B2
(45) Date of Patent: Jun. 4, 2019

(54) METHOD, DEVICE AND SYSTEM FOR PROCESSING PARALLEL SERVICES

(71) Applicant: TENCENT TECHNOLOGY (SHENZHEN) COMPANY LIMITED, Shenzhen (CN)

(72) Inventors: Weijie Ni, Shenzhen (CN); Qiming Xie, Shenzhen (CN); Jin Zhang, Shenzhen (CN); Zhimin Yin, Shenzhen (CN); Wenrong Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/621,474

(22) Filed: Feb. 13, 2015

(65) Prior Publication Data

US 2015/0160986 A1 Jun. 11, 2015

Related U.S. Application Data (63) Continuation of application No. PCT/CN2013/081864, filed on Aug. 20, 2013.

(30) Foreign Application Priority Data

Aug. 24, 2012 (CN) .......................... 2012 1 0303495

(51) Int. Cl.
*G06F 9/52* (2006.01)

(52) U.S. Cl.
CPC ..................................... *G06F 9/52* (2013.01)

(58) Field of Classification Search
CPC ........................................................ G06F 9/52
See application file for complete search history.

(56) References Cited

U.S. PATENT DOCUMENTS

| 5,226,159 A | * | 7/1993 | Henson ............ G06F 17/30171 |
| 5,907,675 A | * | 5/1999 | Aahlad .................. G06F 9/465 709/203 |

(Continued)

FOREIGN PATENT DOCUMENTS

| CN | 1556954 A | 12/2004 |
| CN | 101370027 A | 2/2009 |

(Continued)

OTHER PUBLICATIONS

Search Report in International Application No. PCT/CN2013/081864 dated Nov. 28, 2013.

(Continued)

*Primary Examiner* — James J Lee
*Assistant Examiner* — Jorge A Chu Joy-Davila
(74) *Attorney, Agent, or Firm* — Morgan, Lewis & Bockius LLP (57) ABSTRACT

The present invention provides a method a device and a system for processing parallel services, which includes: determining, by a synchronization locking server, whether a service request for locking is locked after receiving a locking request sent by a service server, and locking the service request when the service request is unlocked and returning a locking success response to the service server, or returning a locking failure response to the service server when the service request is locked, so as to ensure accuracy of a processing result of the parallel services that are processed across the cities, IDCs or servers.

12 Claims, 4 Drawing Sheets

(56) References Cited

U.S. PATENT DOCUMENTS

| | | | | |
|---|---|---|---|---|
| 5,933,824 | A | * | 8/1999 | DeKoning ................ G06F 9/52 |
| 6,023,712 | A | * | 2/2000 | Spear .................... G06F 9/5016 |
| 6,247,099 | B1 | * | 6/2001 | Skazinski ........... G06F 12/0815 |
| | | | | 711/117 |
| 6,304,924 | B1 | | 10/2001 | Varma |
| 6,493,746 | B1 | * | 12/2002 | Enjou ................ H04L 41/0233 |
| | | | | 707/999.008 |
| 7,962,713 | B2 | | 6/2011 | Okaue et al. |
| 2004/0220933 | A1 | | 11/2004 | Walker |
| 2006/0123065 | A1 | * | 6/2006 | Rapp ................. G06F 17/30362 |
| 2008/0077629 | A1 | | 3/2008 | Lorenz et al. |
| 2011/0296069 | A1 | * | 12/2011 | Tarta ...................... G06F 9/526 |
| | | | | 710/200 |

FOREIGN PATENT DOCUMENTS

| | | |
|---|---|---|
| CN | 101631310 A | 1/2010 |
| CN | 101650646 A | 2/2010 |
| CN | 102006179 A | 4/2011 |
| CN | 102081557 A | 6/2011 |
| CN | 102156928 A | 8/2011 |
| CN | 102394867 A | 3/2012 |
| CN | 102508872 A | 6/2012 |
| EP | 2472780 A1 | 7/2012 |

OTHER PUBLICATIONS

International preliminary report on patentability from Application No. PCT/CN2013/081864 filed Mar. 5, 2015.

Office Action from Chinese Application No. 2012103034956 dated Jun. 27, 2017.

Office Action in CN Application No. 201210303495.6 dated Mar. 2, 2018, 9 pages.

Office Action from Chinese Application No. 102081557A dated Aug. 2, 2018.

* cited by examiner

METHOD, DEVICE AND SYSTEM FOR PROCESSING PARALLEL SERVICES

CROSS-REFERENCE TO RELATED APPLICATIONS

This is a continuation of International Application No. PCT/CN2013/081864 filed Aug. 20, 2013 entitled "Method, Device and system for Processing Parallel Services," which claims the priority of Chinese patent application No. 201210303495.6 filed Aug. 24, 2012, the entire respective disclosures of which are incorporated herein by reference.

FIELD OF THE INVENTION

The present invention relates to information technologies, and more particularly, to a method, a device and a system for processing parallel services.

BACKGROUND OF THE INVENTION

A typical internet system model is divided into three layers: an interface layer, a service layer and a data layer. The interface layer is used for forwarding a request of a caller to the service layer and isolating the caller and a service system; the service layer is used for processing the request of the caller in accordance with a certain logical flow and usually returning a processing result; and the data layer is used for storing the processing result of the service layer for the next call. The service layer processes the request in a specific execution sequence that means multiple logical processing steps needed for processing one request, and will read data from the data layer or write an intermediate processing result to the data layer during the processing.

In accordance with characteristics of internet, parallel service layers are often deployed in multiple cities, or in different IDCs (Internet Data Centers) in a same city, or on different servers in a same IDC. At this point, when a same service request appears simultaneously in multiple parallel service layers, the same logical execution sequence will be executed crossly, which creates problems of logical confusion and data inconsistency. Thus, a synchronization mechanism is needed to enable the execution sequence of the same service request to be executed simultaneously among multiple service layers.

At present, there are synchronization schemes for inter-process communication such as a pipe, FIFO (First Input First Output), a named pipe, a shared memory, a message queue, semaphore, etc. However, all the existing synchronization schemes for inter-process communication deal with synchronization requirements among multiple processes deployed on the same server, but they are unable to deal with synchronization requirements of processes across cities, across IDCs and across servers.

As a result, a solution for processing the parallel services is urgently needed, to solve the problems mentioned above.

SUMMARY

The embodiments of the present invention provide a method for processing parallel services, wherein the method includes:

determining, by a synchronization locking server, whether a service request for locking is locked after receiving a locking request sent by a service server; and locking the service request when the service request is unlocked and returning a locking success response to the service server, or returning, a locking failure response to the service server when the service request is locked.

The embodiments of the present invention also provide a method for processing parallel services, wherein the method includes:

sending, by a service server, a locking request for locking a service request to a synchronization locking server, enabling the synchronization locking server to determine whether the service request for locking is locked, and lock the service request when the service request is unlocked and returns a locking success response to the service server, or returns a locking failure response to the service server when the service request is locked;

processing, by the service server, a service according to the service request when receiving the locking success response; and temporarily abandoning, by the service server, the service processing of the service request when receiving the locking failure response, and sending the locking request again to the synchronization locking server according to a preset number of times and/or frequency.

The embodiments of the present invention also provide a synchronization locking server, wherein the synchronization locking server includes:

a receiving module, configured to receive a locking request sent by a service server; and a processing module, configured to determine whether a service request for locking is locked after the receiving module receives the locking request, and lock the service request when the service request is unlocked and return a locking success response to the service server by a sending module, or return a locking failure response to the service server by a sending module when the service request is locked.

DETAILED DESCRIPTION OF THE INVENTION

As for an application scenario of parallel services deployed across the cities, IDCs or servers, multiple parallel service layers simultaneously process a same service request, which causes problems of logical confusion of service processing and data inconsistency. In a parallel service solution provided by the embodiments of the present invention, the service request of one service layer is locked at a time, and then the service processing is carried out, to ensure accuracy of the service processing result.

A clear and complete description of technical solutions of the present invention will be given below, in combination with the accompanying drawings in the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

Figure 1:
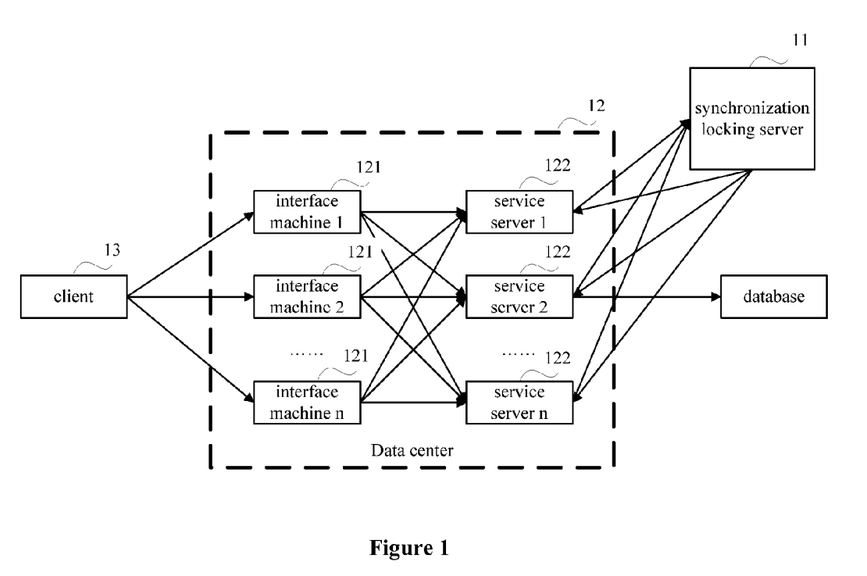
FIG. 1 is an architecture diagram for distributed service processing system provided by an embodiment of the present invention.

The method for processing parallel services provided by the embodiments of the present invention apply to a service processing system including a synchronization locking server and a data center, wherein the service processing system may include multiple data centers that form a distributed architecture, or the service processing system may also include only one data center including multiple service servers that form a distributed architecture. An embodiment of the present invention is illustrated in detail by an example of a distributed service processing system including a synchronization locking server and at least two service servers. As shown in FIG. 1, the distributed service processing system includes synchronization locking server 11 and data center 12, and may also include a database for storing the service processing result. The data center 12 may include multiple interface machines 121 and multiple service servers 122, and each interface machine 121 and each service server 122 form parallel service processing layers, to process services in parallel. The synchronization locking server 11 is used to lock a corresponding service request according to a locking request sent by the service server 122, and unlock a corresponding service request according to a unlocking request sent by the service server 122; the service servers 122 is used to send the locking request and the unlocking request to the synchronization locking server 11, and perform a corresponding service processing according to the service request after the service request is locked; and the interface machine 121 is used to receive the service request sent by client 13 and send the service request to the service server 122.

Figure 2:
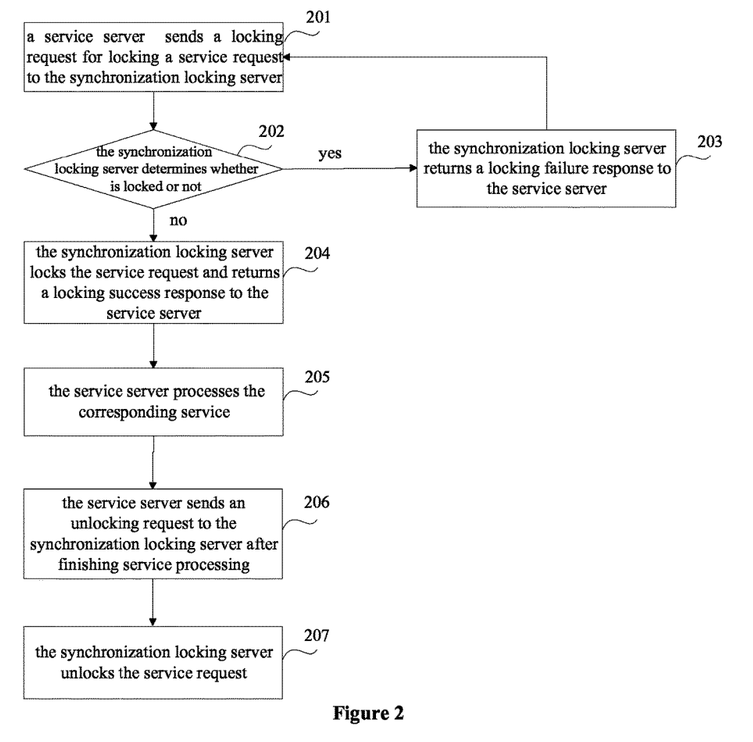
FIG. 2 is a schematic of a parallel service processing flow provided by an embodiment of the present invention.

Take the architecture of distributed service processing system shown in FIG. 1 as an example, and a parallel service processing flow is illustrated in detail in combination with FIG. 2, as shown in the figure, the flow includes the following steps:

In step 201, a service server 122 sends a locking request for locking a service request to the synchronization locking server 11.

Specifically, the client 13 sends the service request to the interface machine 121 which sends the service request to each service server 122 after receiving the service request. The service server 122 does not process corresponding service logic directly after the service server 122 receives the service request sent by the interface machine 121, but send the service request to the synchronization locking server 11, in order to request locking for the service request.

In step 202, the synchronization locking server 11 receives the locking service and determines whether the service request is locked, and perform step 203 when it is locked, otherwise, perform step 204.

In step 203, the synchronization locking server 11 returns a locking failure response to the service server 122.

Specifically, when the synchronization locking server 11 determines that the service request is locked after receiving the locking request, the synchronization locking server 11 returns the locking failure response to the service server 122, so that the service server 122 temporarily abandons the service processing of the service request.

The service server 122 will not perform the corresponding service processing after receiving the locking failure response. Preferably, the service server 122 sends the locking request again to the synchronization locking server according to a preset number of times and/or frequency after receiving the locking failure response sent by the synchronization locking server 11, so as to ensure that the service server 122 has more chance of processing the service request. The number of times and/or sending frequency of sending the locking request again is related to the application scenario and service processing time.

In step 204, the synchronization locking server 11 locks the service request and returns a locking success response to the service server 122, so that the service server 122 processes a service according to the service request. Upon successful locking, the service processing of the corresponding service request can only be performed by the service server that sends the locking request but not performed by other service servers.

In step 205, the service server 122 processes the corresponding service after receiving the locking success response and stores the service processing result in the database. In addition, the other service servers cannot process the service, which prevents the problems of logical confusion of service processing and data inconsistency in the existing technology from happening.

In step 206, the service server 122 sends an unlocking request to the synchronization locking server 11 after finishing service processing.

In step 207, the synchronization locking server 11 unlocks the service request.

Specifically, the synchronization locking server 11 unlocks the service request after receiving the unlocking request for unlocking the service request, wherein the unlocking request is sent by the service server 122 after the service server 122 finishes the service processing.

In the process of parallel service processing, there are two cases that will result in synchronization lock of the service request being permanently locked.

1. When the synchronization locking server 11 determines that the service request is in an unlocked state, the synchronization locking server 11 locks the service request and returns a locking success response to the corresponding service server 122, but the service server 122 has not received the locking success response. At this point, the service request is in a locked state, but the service server 122 cannot perform the corresponding service processing. When another service server 122 sends a locking request for locking the service request to the synchronization locking server 11, the synchronization locking server 11 will return a locking failure response because the service request is still in the locked state, which results in the service request being permanently locked.

2. When no unlocking request sent by the service server 122 is received after the synchronization locking server 11 locks the service request, this will result in the service request being permanently locked.

Therefore, in order to prevent the service request from being permanently locked, a timer (timing duration of the timer is a validity period of locking time) may be set on the synchronization locking server 11 to limit the locking time of the service request, wherein the timing duration of the timer is no less than a processing time of the service request processed by the service server 122.

Figure 3:
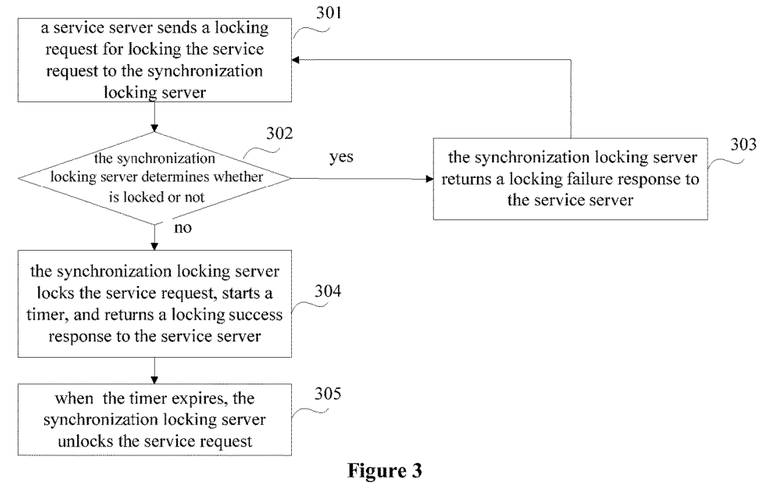
FIG. 3 is a schematic of another parallel service processing flow provided by an embodiment of the present invention.

As shown in FIG. 3, a parallel service processing flow of non-normal unlocking is provided by another embodiment of the present invention, wherein the flow includes the following steps.

In step 301, a service server 122 sends a locking request for locking the service request to the synchronization locking server 11.

In step 302, the synchronization locking server 11 receives the locking service and determines whether the service request is locked, and perform step 303 when it is locked, otherwise, perform step 304.

In step 303, the synchronization locking server 11 returns a locking failure response to the service server 122.

In step 304, the synchronization locking server 11 locks the service request, starts a timer, and returns a locking success response to the service server 122.

In step 305, when the timer expires, the synchronization locking server 11 unlocks the service request.

The newly added operations in the embodiment are the operation of starting the timer in step 304 and the operation of unlocking the service request when the timer expires in step 305. By utilizing the locking time of service request monitored by the timer and changing the locking state of the service request when a condition is met, the synchronization locking server 11 may only determine the locking state of the service request without considering the locking time when each time the locking request is received, thus improving processing efficiency of the synchronization locking server 11. Processing ability of the system may be improved obviously in the condition of receiving locking request multiple times within a short time. When a communication failure or another failure occurs between the synchronization locking server 11 and the service server 122, the locking success response sent by the synchronization locking server 11 cannot be sent to the service server 122, the service server 122 cannot perform corresponding service processing, and the service request is actually in locked state, which results in the service request being permanently locked; or when the unlocking request sent by the service server 122 cannot be sent to the synchronization locking server 11, which will also result in the service request being permanently locked. The timer is utilized to limit a valid period of locking time in the embodiment, and the service request will be forced unlocked when the valid period of locking time is reached, which can efficiently prevent the service request from being permanently locked, to ensure that the service flow goes smoothly.

In the above embodiments of the present invention, the process that the synchronization locking server determines whether the service request is locked (step 202) and locks (step 204) or unlocks (step 207) the service request, may be implemented by the following way.

A locking data list table is established in the synchronization locking server 11, to record correspondence between service identities and start times of locking, wherein the locking data list table is shown in table 1.

TABLE 1

| service identity | start time of locking |
| --- | --- |
| ID1 | 2012-07-03 15:00:12 |
| ID4 | 2012-07-03 09:35:40 |
| ID2 | 0 |
| ... | |

The locking data list table includes the correspondence between the service identities and the start times of locking, wherein the service identity may be a service-type identity or a user identity in accordance with different scenarios. Preferably, the synchronization locking server 11 may extract a service identity from the locking request, and lock the service request corresponding to the service identity. Preferably, the synchronization locking server 11 may select a hash algorism or a total direct mapping algorism to perform an operation on the service identity according to the different scenarios.

In the condition that the service identities are distributed more dispersedly, the service identities may be calculated by the hash algorism. For example, the locking process may be as follows: the synchronization locking server 11 performs a hash operation on the service identity, indexes the service identity for locking according to the hash result, and sets start time of locking corresponding to the indexed service identity as receiving time of the locking request. Correspondingly, the unlocking process may be as follows: the synchronization locking server 11 performs the hash operation on the service identity, indexes the service identity for unlocking according to the hash result, and clears the indexed service identity and the corresponding start time of locking. Correspondingly, the process of determining whether the corresponding service request is locked may be as follows: the synchronization locking server 11 performs the hash operation on the service identity, indexes the service identity for unlocking in the table 1 according to the hash result, and determines the service request for locking as a locked one when the service identity and the corresponding start time of locking have been indexed, otherwise determines the service request for locking as an unlocked one.

In the condition that the service identities are more centrally distributed, the service identities may be calculated by the total direct mapping algorism. For example, the locking process may be as follows: the synchronization locking server 11 performs an operation on the service identity according to the total direct mapping algorism, indexes the service identity for locking according to the operation result, and sets the start time of locking corresponding to the indexed service identity as the receiving time of the locking request. Correspondingly, the unlocking process may be as follows: the synchronization locking server 11 performs an operation on the service identity according to the total direct mapping algorism, indexes the service identity for unlocking according to the operation result, and sets the start time of locking corresponding to the indexed service identity as an initial value. Correspondingly, the process of determining whether the corresponding service request is locked may be as follows: the synchronization locking server 11 performs an operation on the service identity according to the total direct mapping algorism and indexes the service identity for unlocking in the table 1 according to the operation result, and determines the service request for locking as a locked one when the service identity has been indexed and the corresponding start time of locking is not the initial value, otherwise determines the service request for locking as an unlocked one, or determines the service request for locking as an unlocked one, when the service identity and the corresponding start time of locking (receive the locking request of the service for the first time) have not been indexed or the service identity has been indexed and the corresponding start time of locking is the initial value (the service request has been unlocked).

For example, when the related record is not found by querying whether the service request of which the service identity is ID3 is locked in table 1, the service request may be determined as the first request for locking, and perform step 204; when a locking record is found by querying whether the service request of which the service identity is ID2 is locked in table 1, where the locking time is 0 (the initial value of the locking time that is 0 in this embodiment can be set arbitrarily, which is known for those skilled in the art) in the locking record, it can be determined that the service request had been locked and then unlocked, and perform step 204; and when a locking record is found by querying whether the service request of which the service identity is ID1 is locked in table 1, wherein the locking time is not 0, the service request may be determined as the locked one, and perform step 203.

In the above method, when the service identity is calculated by the hash algorism, in the process of unlocking, the start time of locking corresponding to the indexed service identity can be set as an initial value when the service identity for unlocking is indexed according to the hash result. Correspondingly, in the process of determining whether the service request for locking is locked, when the service identity for locking is indexed in the table 1 according to the hash result, the service request for locking may be determined as the locked one when the service identity has been indexed and the corresponding start time of locking is not the initial value, and the service request for locking may be determined as the unlocked one when the service identity and the corresponding start time of locking (receive the locking request of the service for the first time) have not been indexed, or the service identity has been indexed and the corresponding start time of locking is the initial value (the service request is unlocked).

For the same reason, when the service identity is calculated by the total direct mapping algorism, in the process of unlocking, the indexed service identity and the corresponding start time of locking may be cleared when the service identity for unlocking is indexed according to the operation result. Correspondingly, in the process of determining whether the service request for locking is locked, when the service identity for locking is indexed in the table 1 according to the operation result, the service request for locking is determined as the locked one when the service identity and the corresponding start time of locking have been indexed, otherwise the service request for locking is determined as the unlocked one.

In addition to recording the start time of locking and determining whether the service request is in the locked state by determining the start time of locking, in another embodiment of the present invention, a locking/unlocking state may be recorded on the synchronization locking server 11 and whether the service request is locked is determined in accordance with the locking/unlocking state of the service request. In this embodiment, A locking data list table (table 2) is established in the synchronization locking server 11, to record correspondence between service identities and states of the service request, wherein the states of the service request includes the locking state and the unlocking state. The synchronization locking server 11 may extract a service identity from the locking request, and operate on and index the service identity, thus recording the state of the service request corresponding to the service identity.

TABLE 2

| Service identity | Locking state |
| --- | --- |
| ID1 | 1 |
| ID4 | 1 |

TABLE 2-continued

| Service identity | Locking state |
| --- | --- |
| ID2 | 0 |
| ... | |

The synchronization locking server 11 locks the service request corresponding to the service identity. Specifically, the synchronization locking server 11 performs a hash operation on the service identity, indexes the service identity for locking according to the hash result, and sets the service request corresponding to the indexed service identity to a locked state. For example, in the table 2, a state value of the service request is set to 1.

Correspondingly, the synchronization locking server 11 unlocks the service request corresponding to the service identity. Specifically, the synchronization locking server 11 performs the hash operation on the service identity, indexes the service identity for unlocking according to the hash result, and clears the indexed service identity and the state of the corresponding service request or sets the service request corresponding to the indexed service identity to an unlocked state. For example, the state value of the service request is set to 0.

Correspondingly, the synchronization locking server 11 determines whether the corresponding service request is locked according to the service identity. Specifically, the synchronization locking server 11 performs the hash operation on the service identity and indexes the service identity for locking according to the hash result, and determines the service request for locking as the locked one when the service identity and the state of the corresponding service request (for example, the indexed state value of the service request corresponding to the service identity is 1) have been indexed, or determines the service request for locking as the unlocked one when the service identity and the state of the corresponding service request have not been indexed or the service identity has been indexed and the state value of the service request corresponding to the service identity, such as 0, means the unlocked state.

In accordance with the service identity, the synchronization locking server 11 may realize locking, unlocking and determination of the service request state by the total direct mapping algorism.

Specifically, the locking process may be as follows: the synchronization locking server 11 performs an operation on the service identity according to the total direct mapping algorism, indexes the service identity for locking according to the operation result, and sets the service request corresponding to the indexed service identity to a locked state. For example, the state value of the service request is set to 1.

Correspondingly, the unlocking process may be as follows: the synchronization locking server 11, in accordance with the service identity, performs an operation on the service identity of the service request for unlocking by the total direct mapping algorism, indexes the service identity for unlocking according to the operation result, and sets the service request corresponding to the indexed service identity to the unlocked state (the state value of the service request is set to 0) or clears the indexed service identity and the state of the corresponding service request.

Correspondingly, the process of determining whether the corresponding service request is locked according to the service identity may be as follows: the synchronization locking server 11 performs an operation on the service identity according to the total direct mapping algorism and indexes the service identity for locking according to the operation result, and determines the service request for locking as the locked one when the service identity has been indexed and the state value of the service request corresponding to the service identity is 1, otherwise determines the service request for locking as the unlocked one when the service identity has been indexed and the state value of the service request corresponding to the service identity is 0, or the service identity and the state of the corresponding service request have not been indexed.

By setting a mechanism of locking/unlocking on the parallel service request in the embodiments of the present invention, as for one service request, make sure only one service layer successfully requests a lock at a time in the distributed service processing system including at least two service server, so as to resolve the problems of logical confusion of service processing and data inconsistency when a same service request is executed with parallel services deployed across the cities, IDCs or servers, and ensure accuracy of the service processing result.

Figure 4:
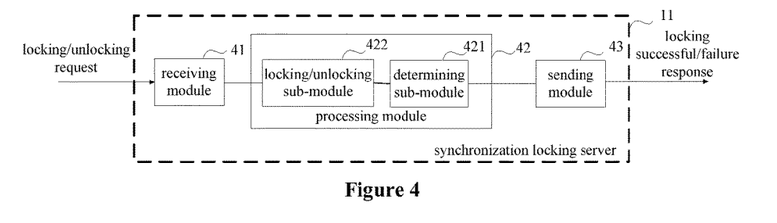
FIG. 4 a structural diagram of a synchronization locking server provided by an embodiment of the present invention.

Based on the same idea, the embodiments of the present invention also provide a synchronization locking server, as shown in FIG. 4, wherein the synchronization locking server includes a receiving module 41, a processing module 42 and a sending module 43.

The receiving module 41 is configured to receive a locking request sent by a service server.

The processing module 42 is configured to determine whether a service request for locking is locked after the receiving module 41 receives the locking request, and lock the service request when the service request is unlocked and return a locking success response to the service server by a sending module 43, or return a locking failure response to the service server by a sending module 43 when the service request is locked.

The processing module 42 is further configured to start a timer after locking the service request and unlock the service request when the timer expires, where timing duration of the timer is no less than a processing time of the service request processed by the service serve.

The receiving module 41 is further configured to receive an unlocking request, which is sent by the service server after the service server finishes service processing.

The processing module 42 is further configured to unlock the service request for unlocking after the receiving module 41 receives the unlocking request sent by the service sever.

The processing module 42 comprises a determining sub-module 421 and a locking/unlocking sub-module 422.

The locking/unlocking sub-module 422 is configured to extract a service identity from the locking request received by the receiving module 41 and lock the service request corresponding to the service identity when the determining sub-module 421 determines that the service request for locking is unlocked, and to extract a service identity from the unlocking request received by the receiving module and unlock the service request corresponding to the service identity.

The determining sub-module 421 is configured to extract a service identity from the locking request received by the receiving module 41 and determine whether the corresponding service request is locked according to the service identity.

In an embodiment, the locking/unlocking sub-module 421 is further configured to perform a hash operation on the service identity when the determining sub-module 422 determines that the service request is unlocked, index the service identity for locking according to the hash result and set start time of locking corresponding to the indexed service identity as receiving time of the locking request, and to perform the hash operation on the service identity when the receiving module 41 receives the unlocking request sent by the service server, index the service identity for unlocking according to the hash result, and clear the indexed service identity and the corresponding start time of locking or set the start time of locking corresponding to the indexed service identity as an initial value.

The determining sub-module 421 is further configured to perform the hash operation on the service identity, and index the service identity for locking according to the hash result, and to determine the service request for locking as a locked one when the service identity and the corresponding start time have been indexed, otherwise determine the service request for locking as an unlocked one, or to determine the service request for locking as a locked one when the service identity has been indexed and the corresponding start time of locking is not the initial value, otherwise determine the service request for locking as an unlocked one when the service identity has been indexed and the corresponding start time of locking is the initial value (the service request is unlocked).

In another embodiment, the locking/unlocking sub-module 422 is further configured to perform an operation on the service identity according to the total direct mapping algorism when the determining sub-module 421 determines that the service request is unlocked, index the service identity for locking according to the operating result, and set the start time of locking corresponding to the indexed service identity as the receiving time of the locking request, and to perform the operation on the service identity according to the total direct mapping algorism when the receiving module 41 receives the unlocking request sent by the service server, index the service identity for unlocking according to the operating result, and set the start time of locking corresponding to the indexed service identity as an initial value or clear the indexed service identity and the corresponding start time of locking.

The determining sub-module 421 is further configured to perform the operation on the service identity according to the total direct mapping algorism and index the service identity for locking according to the operation result, and to determine the service request for locking as a locked one when the service identity has been indexed and the corresponding start time of locking is not the initial time, otherwise determine the service request for locking as an unlocked one.

In an embodiment, the locking/unlocking sub-module 422 is further configured to perform the hash operation on the service identity when the determining sub-module 421 determines that the service request is unlocked, index the service identity for locking according to the hash result and set the service request corresponding to the indexed service identity to the locked state, and to perform the hash operation on the service identity on the service request for unlocking when the receiving module 41 receives the unlocking request sent by the service server, and clear the indexed service identity and the state of the corresponding service request, or set the service request corresponding to the indexed service identity to the unlocked state. For example, the state value of the service request is set to 0.

The determining sub-module 421 is further configured to perform the hash operation on the service identity and index the service identity for locking according to the hash result, and to determine the service request for locking as a locked one when the service identity and the state of the corresponding service request have been indexed, otherwise determine the service request for locking as an unlocked one, or to determine the service request for locking as an unlocked one when the service identity has been indexed and the state value of the service request corresponding to the service identity, such as 0, means the unlocked state.

In another embodiment, the locking/unlocking sub-module 422 is further configured to perform the operation on the service identity according to the total direct mapping algorism when the determining sub-module 421 determines that the service request is unlocked, index the service identity for locking according to the operating result and set the service request corresponding to the indexed service identity to the locked state, and to perform the operation on the service identity of the service request for unlocking according to the total direct mapping algorism when the receiving module 41 receives the unlocking request sent by the service server, index the service identity for unlocking according to the operating result, and set the service request corresponding to the indexed service identity to the unlocked state, or clear the indexed service identity and the state of the corresponding service request.

The determining sub-module 421 is further configured to perform the operation on the service identity according to the total direct mapping algorism and index the service identity for locking according to the operating result, and to determine the service request for locking as a locked one when the service identity has been indexed and the state value of the service request corresponding to the service identity, such as 1, means the locked state, or to determine the service request for locking as an unlocked one when the service identity has been indexed and the state value of the service request corresponding to the service identity, such as 0, means the unlocked state, or the service identity and the state of the corresponding service request have not been indexed.

Figure 5:
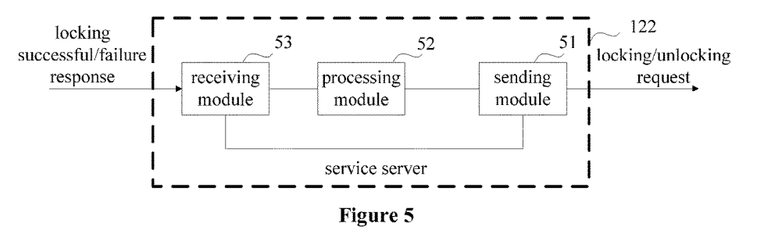
FIG. 5 is a structural diagram of a service server provided by an embodiment of the present invention.

Based on the same idea, the embodiments of the present invention also provide a service server, as shown in FIG. 5, wherein the service server includes a sending module 51, a processing module 52 and a receiving module 53.

The sending module 51 is configured to send a locking request for locking a service request to a synchronization locking server, enabling the synchronization locking server to determine whether the service request for locking is locked, and lock the service request when the service request is unlocked and return a locking success response to the service server, or return a locking failure response to the service server when the service request is locked.

The processing module 52 is configured to process a service according to the service request when the receiving module 53 receives the locking success response, and temporarily abandon the service processing of the service request when the receiving module 53 receives the locking failure response and sends the locking request again to the synchronization locking server through the sending module 51 according to a preset number of times and/or frequency.

The sending module 51 is further configured to send an unlocked request to the synchronization locking server after the processing module 52 finishes the service processing, enabling the synchronization locking server to unlock the service request.

Based on the same idea, the embodiments of the present invention also provide a parallel service processing system, as shown in FIG. 1, wherein the parallel service processing system includes the synchronization locking server and at least two service servers.

Those skilled in the art may understand that the modules in the apparatus of the embodiments disclosed herein may be distributed in the apparatus of the embodiments according to the description of the embodiments, and may also be varied to be located in one or more apparatuses different from those of the embodiments. The modules of the above embodiments may be integrated into one module or may be further divided into multiple sub-modules.

Based on the above-description of the examples, those skilled in the art would clearly understand that the examples may be implemented by software plus a necessary common hardware platform, of course, and they may also be implemented by hardware. In many cases, the former is a preferred manner. Based on such understanding, the essential part of the technical solution of the present invention or the part contributed to the prior art can be in the form of a software product, and the computer software product is stored in a storage medium and includes several codes to make a computer device (such as a handset, a personal computer, a server or a network device) perform the method in embodiments of the present invention.

Figure 6:
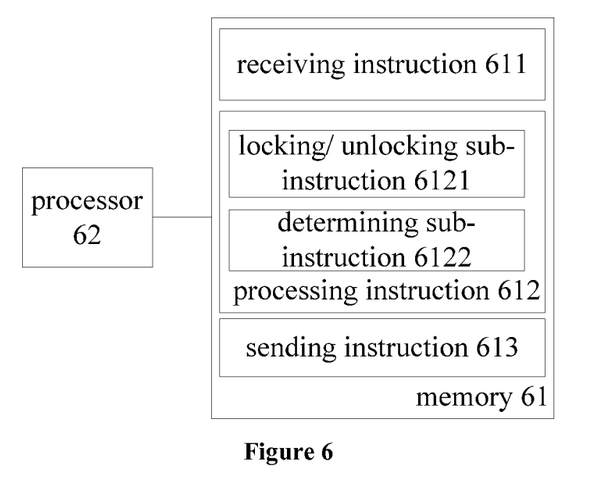
FIG. 6 is a structural diagram of another synchronization locking server provided by an embodiment of the present invention.

For example, FIG. 6 is a structural diagram of another synchronization locking server provided by an embodiment of the present invention. As shown in FIG. 6, the synchronization locking server includes memory 61 and processor 62 that communicates with the memory 61, where receiving instruction 611, processing instruction 612 and sending instruction 613, which can be performed by the processor 62, are stored in the memory 61.

The receiving instruction 611 is used to indicate a reception of a locking request sent by the service server.

The processing instruction 612 is used to indicate that whether a service request for locking is locked is determined after the receiving module receives a locking request, and to indicate that a locking is performed on the service request when the service request is unlocked and a locking success response is returned to the service server by the sending instruction 613, or a locking failure response is returned to the service server by the sending instruction 613 when the service request is unlocked.

Further, the processing instruction 612 is further used to indicate that a timer is started after the locking is performed on the service request, and the service request for unlocking is unlocked when the timer expires, wherein timing duration of the timer is no less than a processing time of the service request processed by the service serve.

In an embodiment, the receiving instruction 611 is further used to indicate a reception of an unlocking request sent by the service server, wherein the unlocking request is sent by the service server after the service server finishes service processing.

The processing instruction 612 is further used to indicate that the service request for unlocking is unlocked after the unlocking request sent by the service server is received by performing the receiving instruction 611.

Specifically, the processing instruction 612 may include a locking/unlocking sub-instruction 6121 and a determining sub-instruction 6122.

In an embodiment, the memory 61 is further used to store a locking list data table for recording correspondence between service identities and start times of locking.

At this point, the locking/unlocking sub-instruction 6121 may further used to indicate that a service identity is extracted from the locking request received by performing the receiving instruction 611, and the service request is locked according to the service identity when the service request for locking is unlocked, which is determined by performing the determining sub-instruction 6122, and to indicate that a service identity is extracted from the unlocking request received by performing the receiving instruction 611 and the service request is unlocked according to the corresponding service identity.

The determining sub-instruction 6122 is used to indicate that the service identity is extracted from the unlocking request received by performing the receiving instruction 611, and whether the corresponding service request is locked is determined according to the service identity.

In an embodiment, the locking/unlocking sub-instruction 6121 is further used to indicate that an operation is performed on the service identity according to a preset algorithm when the service request is unlocked, which is determined by performing the determining sub-instruction 6122, the service identity for locking is indexed according to an operation result and the star time of locking corresponding to the indexed service identity is set as the receiving time of the locking request, and to indicate that the operation is performed on the service identity according to the set algorithm when the unlocking request is received by performing the receiving instruction 611, the service identity for unlocking is indexed according to the operation result, and the indexed service identity and the corresponding start time of locking are cleared.

The determining sub-instruction 6122 is further configured to indicate that the operation is performed on the service identity according to the preset algorithm, the service identity for locking is indexed according to the operation result, and the service request for locking is determine as a locked one when the service identity and the corresponding start time of locking have been indexed, otherwise the service request for locking is determined as an unlocked one.

In another embodiment, the memory 61 is further used to store a locking data list table for recording correspondence between service identities and the state of the service request.

At this point, the locking/unlocking sub-instruction 6121 is further used to indicate that the operation is performed on the service identity according to the preset algorithm when the service request is unlocked, which is determined by performing the determining sub-instruction 6122, the service identity for locking is indexed according to the operation result, and the start time of locking corresponding to the indexed service identity is set as the receiving time of the locking request, and to indicate that the operation is performed on the service identity according to the preset algorithm when the unlocking request sent by the service server is received by performing the receiving instruction 611, the service identity for unlocking is indexed according to the operation result, and the start time of locking corresponding to the indexed service identity is set as an initial value.

The determining sub-instruction 6122 is further used to indicate that the operation is performed on the service identity according to the preset algorithm, the service identity for locking is indexed according to the operation result, and the service request for locking is determined as a locked one when the service identity has been indexed and the corresponding start time of locking is not the initial value, otherwise the service request for locking is determined as an unlocked one.

In another embodiment, the locking/unlocking sub-instruction 6121 is further configured to indicate that whether a service request for locking is locked is determined by performing the determining sub-instruction 6122, the operation is performed on the service identity according to the preset algorithm, the service identity for locking is indexed according to the operation result, and the service request corresponding to the indexed service identity is set to a locked state, and to indicate that the operation is performed on the service identity according to the preset algorithm when the unlocking request is received by performing the receiving instruction 611, the service identity for unlocking is indexed according to the operation result, and the indexed service identity and the state of the corresponding service request are cleared.

The determining sub-instruction 6122 is further configured to indicate that the operation is performed on the service identity according to the preset algorithm, the service identity for locking is indexed according to the operation result, and the service request for locking is determined as a locked one when the service identity and the state of the corresponding service request have been indexed, otherwise the service request for locking is determined as an unlocked one.

In another embodiment, the locking/unlocking sub-instruction 6121 is further used to indicate that the operation is performed on the service identity according to the preset algorithm when the service request is unlocked, which is determined by performing the determining sub-instruction 6122, the service identity for locking is indexed according to the operation result, and the service request corresponding to the indexed service identity is set to a locked state, and to indicate that the operation is performed on the service identity of the service request for unlocking according to the preset algorithm when the unlocking request is received by performing the receiving instruction 611, the service identity for unlocking is indexed according to the operation result, and the service request corresponding to the indexed service is set to an unlocked state.

The determining sub-instruction 6122 is further configured to indicate that the operation is performed on the service identity according to the preset algorithm, the service identity for locking is indexed according to the operation result, and the service request for locking is determined as a locked one when the service identity has been indexed and the state value of the service request corresponding to the service identity, such as 1, means the locked state, otherwise the service request for locking is determined as an unlocked one when the service identity has been indexed and the state value of the service request corresponding to the service identity, such as 0, means the unlocked state.

In the embodiments shown in FIG. 6, the preset algorithm is the hash algorism or the total direct mapping algorism.

Figure 7:
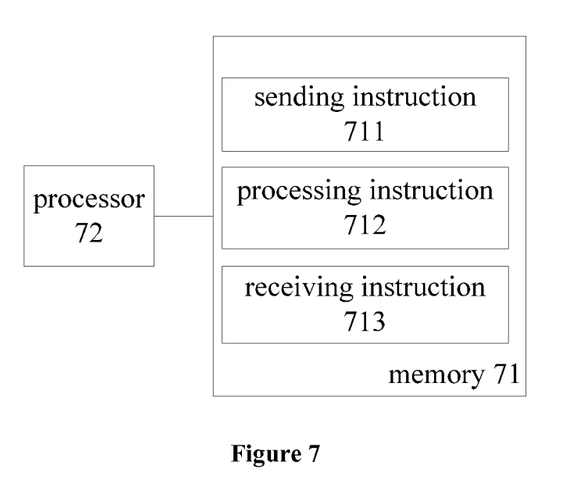
FIG. 7 is a structural diagram of another service server provided by an embodiment of the present invention.

FIG. 7 is a structural diagram of another service server provided by an embodiment of the present invention. As shown in FIG. 7, the service server includes memory 71 and processor 72 that communicates with the memory 71, where sending instruction 711, processing instruction 712 and receiving instruction 713, which can be performed by the processor 72, are stored in the memory 71.

The sending instruction 711 is used to indicate that a locking request for locking a service request is sent to a synchronization locking server, enabling the synchronization locking server to determine whether the service request for locking is locked, and lock the service request when the service request is unlocked and return a locking success response to the service server, or return a locking failure response to the service server when the service request is locked.

The processing instruction 712 is used to indicate that a service is processed according to the service request when the locking success response is received by performing the receiving instruction 713, and to indicate that the service processing of the service request is temporarily abandoned when the locking failure response is received by performing the receiving instruction 713, and the locking request is sent to the synchronization locking server again by performing the sending instruction 711 according to a preset number of times and/or frequency.

In an embodiment, the sending instruction 711 is further used to indicate that an unlocking request is sent to the synchronization locking server after the service processing is finished by performing the processing instruction 712, enabling the synchronization locking server to unlock the service request.

The foregoing are only preferred embodiments of the present invention. It should be noted that, for those of ordinary skill in the art, any improvement and modification made without departing from the principle of the present invention should fall within the scope of the present invention.

What is claimed is:

1. A computer-implemented method for processing parallel services, the method comprising:
   receiving, by a synchronization locking server, a locking request for locking a service request sent by a service server, wherein the locking request carries a service identity, and the service identity is a service-type identity or a user identity that do not change over time;
   extracting, by the synchronization locking server, the service identity from the received locking request, and determining whether a service request corresponding to the service identity is locked or not, further comprising:
   performing an operation on the service identity according to a preset hash algorithm, and determining whether the service identity has been indexed or not according to the operation result, and
   determining, using a locking data list table, that (i) the service request is locked when the service identity has been indexed and a start time of locking the service request has not been cleared, (ii) the service request is unlocked when the service identity has not been indexed, and (iii) the service request is to be unlocked when the start time of locking the service request has been cleared;
   in accordance with a determination that the service request is locked, returning a locking failure response to the service server;
   in accordance with a determination that the service request is unlocked, indexing the service identity, locking the service request corresponding to the service identity by recording a result of the preset hash algorithm as the service identity and the corresponding start time of locking for the service request in the locking data list table, and returning a locking success response to the service server, wherein the service server performs a service processing based on the service request;
   in accordance with a determination that the service request is to be unlocked, clearing the indexed service identity and the corresponding start time of locking the service request and locking the service request corresponding to the service identity by recording a result of the preset hash algorithm as the service identity and the corresponding start time of locking for the service request in the locking data list table, and returning a locking success response to the service server;
   receiving, by the synchronization locking server, an unlocking request sent by the service server, after the service server finishes the service processing extracting, by the synchronization locking server, the service identity from the received unlocking request; and
unlocking, by the synchronization locking server, the service request corresponding to the service identity.

2. The computer-implemented method of claim 1, wherein after locking the service request, the method further comprises:
   starting, by the synchronization locking server, a timer, wherein timing duration of the timer is no less than processing time of the service request processed by the service server; and
   unlocking, by the synchronization locking server, the service request when the timer expires.

3. The computer-implemented method of claim 1, wherein the process of locking, by the synchronization locking server, the service request corresponding to the service identity comprises: performing, by the synchronization locking server, the operation on the service identity according to the preset hash algorithm, indexing the service identity to be locked according to the operating result, and setting the start time of locking the service request corresponding to the indexed service identity as a receiving time of the locking request; and
   wherein the process of determining whether the corresponding service request to be locked is locked according to the service identity further comprises:
   determining the service request to be locked as a locked one when the service identity and the corresponding start time have been indexed, otherwise determining the service request for locking as an unlocked one, or determining the service request to be locked as a locked one. when the service identity has been indexed and the corresponding start time of locking is not the initial value, otherwise determining the service request to be locked as an unlocked one.

4. The computer-implemented method of claim 1, wherein the process of locking, by the synchronization locking server, the service request corresponding to the service identity comprises:
   performing, by the synchronization locking server, the operation on the service identity according to the preset hash algorithm, indexing the service identity to be locked according to the operating result, and setting the service request corresponding to the indexed service identity to a locked state;
   wherein the process of unlocking, by the synchronization locking server, the service request corresponding to the service identity comprises: performing, by the synchronization locking server, the operation on the service identity according to the preset hash algorithm, indexing the service identity for unlocking according to the operating result, and clearing the indexed service identity and the state of the corresponding service request, or setting the service request corresponding to the indexed service identity to an unlocked state.

5. A synchronization locking server, comprising a memory and a processor communicating with the memory, wherein the memory stores instructions, that when executed by the processor configure the processor to perform the following operations:
   receiving, by a synchronization locking server, a locking request for locking a service request sent by a service server, wherein the locking request carries a service identity, and the service identity is a service-type identity or a user identity that do not change over time;

extracting, by the synchronization locking server, the service identity from the received locking request, and determining whether a service request corresponding to the service identity is locked or not, further comprising:
  performing an operation on the service identity according to a preset hash algorithm, and determining whether the service identity has been indexed or not according to the operation result, and
  determining, using a locking data list table, that (i) the service request is locked when the service identity has been indexed and a start time of locking the service request has not been cleared, (ii) the service request is unlocked when the service identity has not been indexed, and (iii) the service request is to be unlocked when the start time of locking the service request has been cleared;
in accordance with a determination that the service request is locked, returning a locking failure response to the service server;
in accordance with a determination that the service request is unlocked, indexing the service identity, locking the service request corresponding to the service identity by recording a result of the preset hash algorithm as the service identity and the corresponding start time of locking for the service request in the locking data list table, and returning a locking success response to the service server, wherein the service server performs a service processing based on the service request;
in accordance with a determination that the service request is to be unlocked, clearing the indexed service identity and the corresponding start time of locking the service request and locking the service request corresponding to the service identity by recording a result of the preset hash algorithm as the service identity and the corresponding start time of locking for the service request in the locking data list table, and returning a locking success response to the service server;
receiving, by the synchronization locking server, an unlocking request sent by the service server, after the service server finishes the service processing;
extracting, by the synchronization locking server, the service identity from the received unlocking request; and
unlocking, by the synchronization locking server, the service request corresponding to the service identity.

6. The synchronization locking server of claim 5, wherein the processor is further configured to:
  start a timer after locking the service request and unlock the service request when the timer expires, where timing duration of the timer is no less than processing time of the service request processed by the service server.

7. The synchronization locking server of claim 5, wherein the processor is further configured to:
  perform the operation on the service identity according to the preset hash algorithm when determining that the service request is unlocked, index the service identity to be locked according to the operating result and set the start time of locking the service request corresponding to the indexed service identity as a receiving time of the locking request, and
  determine the service request to be locked as a locked one when the service identity and the corresponding start time have been indexed, otherwise determine the service request to be locked as an unlocked one, or determine the service request to be locked as a locked one when the service identity has been indexed and the corresponding start time of locking is not the initial value, otherwise determine the service request to be locked as an unlocked one.

8. The synchronization locking server of claim 5, wherein the processor is further configured to:
  perform the operation on the service identity according to the preset hash algorithm when determining that the service request is unlocked, index the service identity to be locked according to the operating result, and set the service request corresponding to the indexed service identity to a locked state, and perform the operation on the service identity according to the preset hash algorithm when receiving the unlocking request sent by the service server, index the service identity for unlocking according to the operating result, and clear the indexed service identity and the state of the corresponding service request or set the service request corresponding to the indexed service identity to an unlocked state.

9. A non-transitory computer-readable storage medium storing instructions that, when executed by a processor of a synchronization locking server, configure the processor to perform the following operations:
  receiving, by a synchronization locking server, a locking request for locking a service request sent by a service server, wherein the locking request carries a service identity, and the service identity is a service-type identity or a user identity that do not change over time;
  extracting, by the synchronization locking server, the service identity from the received locking request, and determining whether a service request corresponding to the service identity is locked or not, further comprising:
    performing an operation on the service identity according to a preset hash algorithm, and determining whether the service identity has been indexed or not according to the operation result, and
    determining, using a locking data list table, that (i) the service request is locked when the service identity has been indexed and a start time of locking the service request has not been cleared, (ii) the service request is unlocked when the service identity has not been indexed, and (iii) the service request is to be unlocked when the start time of locking the service request has been cleared;
  in accordance with a determination that the service request is locked, returning a locking failure response to the service server;
  in accordance with a determination that the service request is unlocked, indexing the service identity, locking the service request corresponding to the service identity by recording a result of the preset hash algorithm as the service identity and the corresponding start time of locking for the service request in the locking data list table, and returning a locking success response to the service server, wherein the service server performs a service processing based on the service request;
  in accordance with a determination that the service request is to be unlocked, clearing the indexed service identity and the corresponding start time of locking the service request and locking the service request corresponding to the service identity by recording a result of the preset hash algorithm as the service identity and the corresponding start time of locking for the service request in the locking data list table, and returning a locking success response to the service server;

receiving, by the synchronization locking server, an unlocking request sent by the service server, after the service server finishes the service processing;

extracting, by the synchronization locking server, the service identity from the received unlocking request; and unlocking, by the synchronization locking server, the service request corresponding to the service identity.

10. The non-transitory computer-readable storage medium of claim 9, wherein the processor is further configured to:

start a timer after locking the service request and unlock the service request when the timer expires, where timing duration of the timer is no less than processing time of the service request processed by the service server.

11. The non-transitory computer-readable storage medium of claim 9, wherein the processor is further configured to:

perform the operation on the service identity according to the preset hash algorithm when determining that the service request is unlocked, index the service identity to be locked according to the operating result and set the start time of locking the service request corresponding to the indexed service identity as a receiving time of the locking request, and determine the service request to be locked as a locked one when the service identity and the corresponding start time have been indexed, otherwise determine the service request to be locked as an unlocked one, or determine the service request to be locked as a locked one when the service identity has been indexed and the corresponding start time of locking is not the initial value, otherwise determine the service request to be locked as an unlocked one.

12. The non-transitory computer-readable storage medium of claim 9, wherein the processor is further configured to:

perform the operation on the service identity according to the preset hash algorithm when determining that the service request is unlocked, index the service identity to be locked according to the operating result, and set the service request corresponding to the indexed service identity to a locked state, and perform the operation on the service identity according to the preset hash algorithm when receiving the unlocking request sent by the service server, index the service identity for unlocking according to the operating result, and clear the indexed service identity and the state of the corresponding service request or set the service request corresponding to the indexed service identity to an unlocked state.

\* \* \* \* \*